(No Model.)
O. B. & A. E. ROCKWELL.
LAND MARKER.
No. 429,481. Patented June 3, 1890.
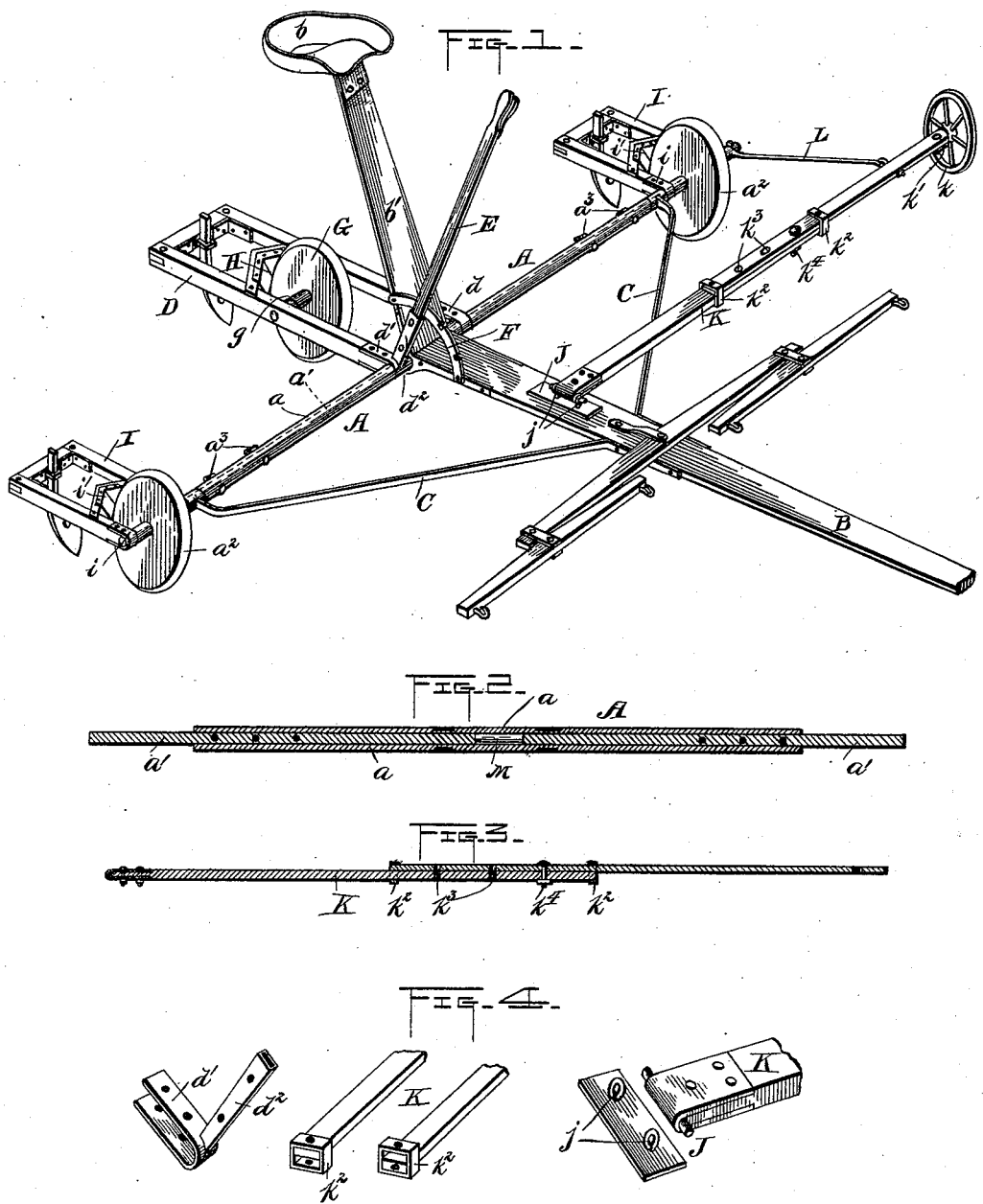
Witnesses
Severance
W. W. Deane
Inventors
Oscar B. Rockwell,
and
Arthur E. Rockwell,
By their Attorney,
L. Deane

UNITED STATES PATENT OFFICE.

OSCAR B. ROCKWELL AND ARTHUR E. ROCKWELL, OF SAN PIERRE, INDIANA.

LAND-MARKER.

SPECIFICATION forming part of Letters Patent No. 429,481, dated June 3, 1890.

Application filed September 3, 1889. Serial No. 322,904. (No model.)

*To all whom it may concern:*

Be it known that we, OSCAR B. ROCKWELL and ARTHUR E. ROCKWELL, citizens of the United States, residing at San Pierre, in the county of Stark and State of Indiana, have invented certain new and useful Improvements in Markers; and we do hereby declare the following to be a full, clear, and exact description of the invention, such as will enable others skilled in the art to which it appertains to make and use the same.

The invention relates to improvements in markers used with planters of various styles, the object being to provide a machine of the kind that may be of simple construction and of light draft, which will mark three rows simultaneously, which can have its marking-wheels adjusted to different distances apart, and which can be readily turned, backed, and otherwise operated; and it consists in the construction and novel combination of parts hereinafter described, illustrated in the accompanying drawings, and pointed out in the appended claims.

In the accompanying drawings, in which similar letters of reference indicate corresponding parts, Figure 1 represents a perspective view of a machine embodying the invention. Fig. 2 represents a detail sectional view of the extensible axle. Fig. 3 is a detail longitudinal section of the adjustable or extensible guide-arm. Fig. 4 shows detail views of the castings that connect certain of the parts.

Referring to the drawings by letter, A designates the axle of the machine composed of the metal tube $a$, about five feet long, and the rods $a'$, preferably of steel, which are slid in the ends of said tube, the outer portions forming journals for the marker-wheels $a^2$, having doubly-beveled rims or rims V-shaped in cross-section. The said journals can be set farther apart by means of the bolts $a^3$, which engage in properly-situated adjusting-openings in the tube and rods.

B is the tongue, of usual construction and having the [usual whiffletrees attached to it, and $b$ is the driver's seat situated on a standard $b'$, that rises from the butt of the tongue, which is secured in a central position on the tube $a$.

C C are braces connecting the ends of said tube with the side of the tongue, and D is a rectangular rearwardly-standing frame, the side rails of which are secured to the tube $a$ on each side of the driver's seat by means of the straps $d\,d'$, which bend around said tube and have their arms bolted to the said side rails.

The strap $d'$ has an outstanding arm $d^2$, to which is bolted the lever-handle E, so that by means of the latter the frame D can be raised and lowered from the driver's seat, the driver partly rotating the shaft A by said lever-handle. The said lever carries a pivoted handle, link-rod, and pawl, of the usual well-known construction, to engage between the teeth of the curved rack-bar F, secured at its end, respectively, to the tongue and seat-standard, thus holding the frame D up when raised.

G is a marker-wheel similar to the wheels $a^2$, and having a similar periphery or rim V-shaped in cross-section, mounted on a short shaft $g$, which is journaled in the side bars of the frame D. The wheel is retained central by collars on each side of its hub.

H is a scraper-plate bent at an angle similar to that of the periphery of said wheel, and secured to a similarly bent bar which has its ends secured to the side rails of the frame D.

The journals at the ends of the rods $a'$ have secured to them small rectangular frames I, the arms of said frames being attached to the respective journals on the sides of the wheels $a^2$ by metal strips $i$, similar to the strap $d$, and in the frames in rear of said wheels on the bent scraper-plates $i'\,i'$, secured in the frames similarly to the scraper H in the frame D.

Upon the tongue, a suitable distance in front of the axle A, is secured a casting J, having the bearings $j\,j$ upon it, and to this casting is connected the gage-arm K, a casting on the edge of said arm being provided with journals or trunnions that enter said bearings. Thus the gage-arm can be turned from one side to the other of the machine and the position of the gage-wheel $k$ on its outer end reversed. The said gage-wheel has a periphery V-shaped in cross-section, is of about one-half the diameter of the marker-wheels, and turns on a short axle $k'$, standing from the end of the gage-arm and secured thereto by a bolt or other suitable means.

The gage-arm is made in two sections, as shown, having surrounding metal straps $k^2$ on their lapping ends, so that the outer section can be slid inward and outward on the inner section, and can by this means and the sets of adjusting-openings $k^3$ and pin or screw $k^4$ be adjusted to different lengths.

L is a brace-bar connecting the outer section of the gage-arm and the journal of the wheel $a^2$ on the same side and serving to steady the said arm. The outer end of said brace-bar is so constructed that it can be attached at various points to the section to permit the latter to be adjusted, as described.

Thus the construction of the machine is simple, strong, and durable, the gage-wheel can be turned to either side, the outer marker-wheels may be moved inward or outward from the central one, and the machine may be readily turned or backed after lifting the frames D and I in the manner described. If desired, plow-points of suitable construction may be attached to standards secured to and depending from the rear rails of the frames D and I.

It is obvious that as the frames I are attached to the ends of the rods $a'$ and the latter are pinned in the tube $a$ said frames will be lifted, together with the frame D, by the lever-handle. When thus raised, the machine can be readily turned or backed. This action will lift the wheel G from the ground, but will not lift the wheels $a^2$ $a^2$, which will then support the machine.

If desired, a cylindrical plug M, Fig. 2, can be inserted between the ends of the steel rods $a'$ in the tube $a$ to brace and stiffen the axle. The said plug, if used, would be preferably of iron.

Having described our invention, we claim—

1. The combination, with the tongue, of the extensible axle rotatable on the tongue, the frames I, and marker-wheels $a^2$, mounted on the end of said axle, the frame D, mounted centrally on said axle, the marker-wheel G, with its shaft, journaled in the frame D, and means, substantially as described, whereby the axle can be rotated and the frames D and I and marker-wheel G can be lifted, as specified.

2. The combination, with the tongue, of the extensible axle rotatable on the tongue and composed of a central tubular part, and steel rods $a'$, rendered adjustable therein by means of the openings and bolts $a^3$, the marker wheels and frames I at the ends of said steel rods, the central frame D, and the marker-wheel G, mounted in the frame D, substantially as specified.

3. The combination, with the tongue, of the extensible axle rotatable on the tongue, the frames I, provided with plow or cultivator points and scrapers $i'$, the marker-wheels mounted on the ends of the axle in the front ends of said frames, and mechanism, substantially as described, whereby said frames can be lifted and held up, as specified.

4. The combination, with the tongue, the extensible axle rotatable on the tongue and composed of a central tubular part, and the steel rods $a'$ and the marker-wheels journaled on the outer ends of said steel rods, of the frame D, secured centrally to the axle, the marker-wheel, with its shaft, journaled in the side rails of said frame, and mechanism, substantially as described, whereby said frame and marker-wheel can be raised and held up, substantially as specified.

5. In a marker, the extensible axle composed of the central tube having adjusting-openings, the steel rods having journals at their ends for the marker-wheels and provided with adjusting-openings registering with those in the tubular part, the adjusting-screws $a^3$, and the central removable metal bar or plug M between the inner ends of said rods to stay the same and reduce jar or shock, substantially as specified.

In testimony whereof we affix our signatures in presence of two witnesses.

OSCAR B. ROCKWELL.
ARTHUR E. ROCKWELL.

Witnesses:
THADDEUS MENEY,
JOSEPH A. BYERS.